United States Patent [19]

Kluth

[11] Patent Number: 4,490,754
[45] Date of Patent: Dec. 25, 1984

[54] VIDEO RECORDER WITH REDUCED AUDIO INTERFERENCE

[75] Inventor: Hans-Jürgen Kluth, Garbsen, Fed. Rep. of Germany

[73] Assignee: Licentia Patent-Verwaltungs-G.m.b.H., Frankfurt am Main, Fed. Rep. of Germany

[21] Appl. No.: 371,474

[22] Filed: Apr. 23, 1982

[30] Foreign Application Priority Data

Apr. 23, 1981 [DE] Fed. Rep. of Germany ....... 3116130
Jun. 5, 1981 [DE] Fed. Rep. of Germany ....... 3122415

[51] Int. Cl.$^3$ ............................................ H04N 5/782
[52] U.S. Cl. ..................................... 360/19.1; 360/64
[58] Field of Search ...................... 360/19.1, 38.1, 64; 358/314, 327, 336, 340, 341; 381/94, 123

[56] References Cited

U.S. PATENT DOCUMENTS 4,216,430  8/1980  Amazawa et al. ..................... 381/94
4,361,813  11/1982  Watatani ............................. 360/30 X Primary Examiner—Donald E. McElheny, Jr.
Attorney, Agent, or Firm—Spencer & Frank

[57] ABSTRACT

A system for recording or playing back a television signal which includes an audio carrier which is frequency modulated with an audio signal, the television signal being recorded along oblique tracks on a magnetic tape and including two playback or recording heads which alternately scan successive tracks. The system includes a controllable amplifier connected to conduct the modulated audio carrier signal, and circuitry connected to control the amplifier for causing it to produce an audio carrier signal during switching between heads in order to reduce interference in the audio signal during such switching.

15 Claims, 13 Drawing Figures

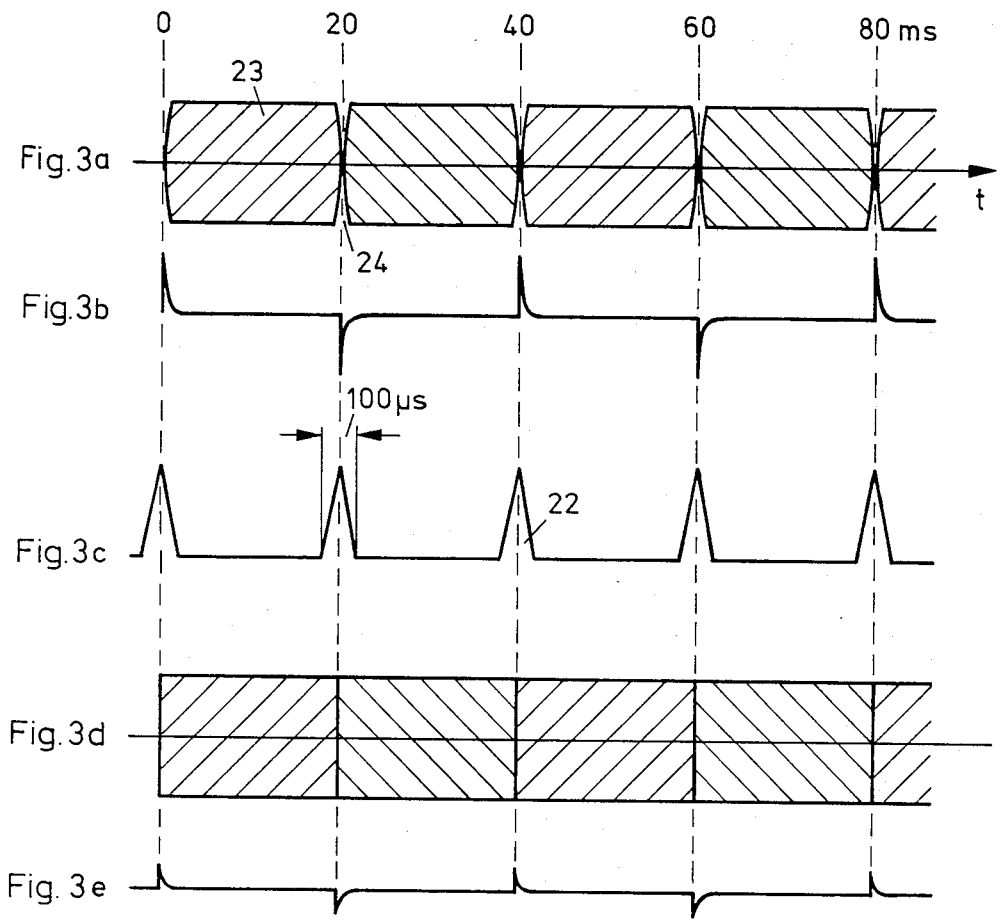
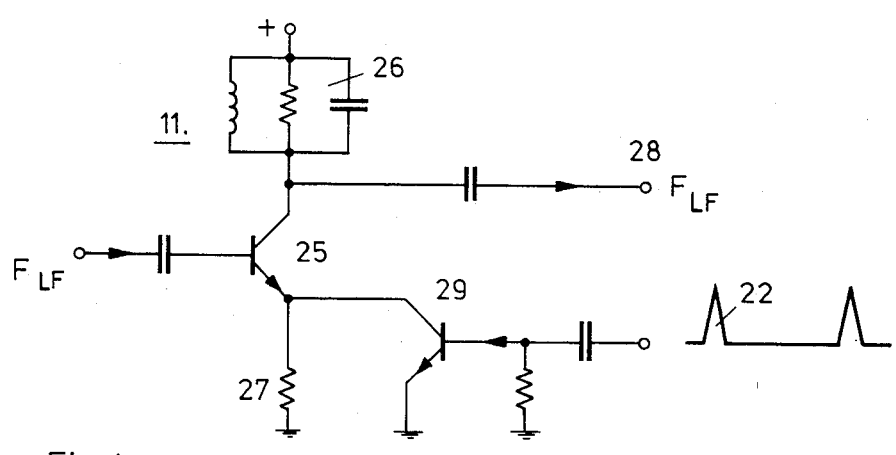

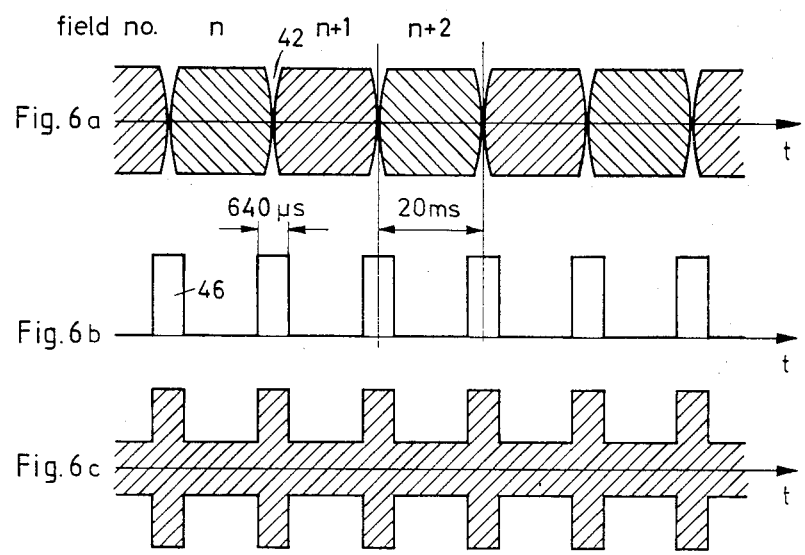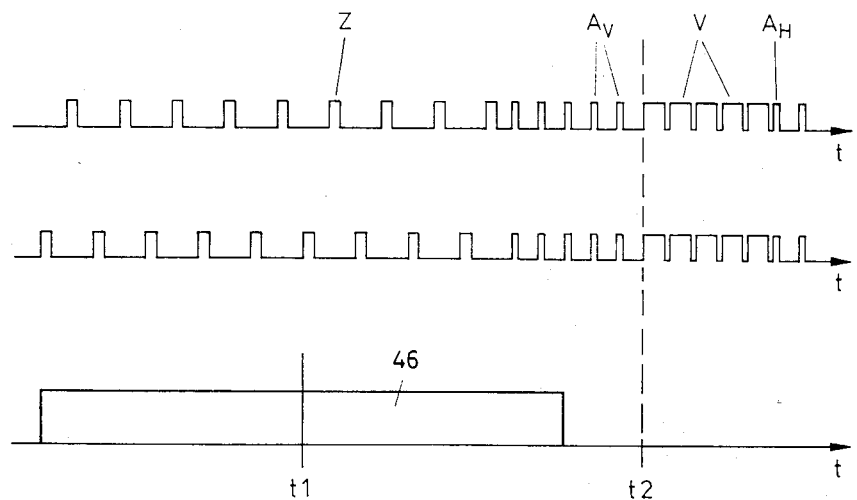
Fig. 7

VIDEO RECORDER WITH REDUCED AUDIO INTERFERENCE

BACKGROUND OF THE INVENTION

In video recorders it is known to record the video signal of a picture carrier on a tape along so-called oblique tracks which extend at an angle of about 6° to the longitudinal direction of the tape. Preferably, one picture field is recorded along each such oblique track. Recording and playback are effected with two heads which alternatingly scan successive oblique tracks.

In such devices, a stationary head records the audio signal on, and plays it back from, a longitudinal track having a width of about 1 mm and extending parallel to the edge of the tape. Thus it is the longitudinal velocity of the tape and not the substantially higher relative velocity between the head and tape on the oblique tracks which has the controlling influence on recording and playback of the audio signal.

In practice, the longitudinal velocity of the tape is reduced to values of the order of magnitude of 2 cm/s in order to increase the total playing time of the tape. This low relative velocity between the tape and the audio head has an adverse influence on the quality of the recorded audio signal. High fidelity sound quality is practically impossible to achieve with such a low relative velocity and the recorded audio signal only has a frequency range of about 70 Hz to 7-10 kHz.

Due to the narrow width of the longitudinal track, there also results a relatively poor signal-to-noise ratio which becomes even worse if two audio signals are recorded for stereo playback since the width of each channel is then of necessity half that of the longitudinal track.

It is conceivable to record the audio signal along the oblique tracks together with the picture carrier in a manner similar to that employed for video discs. However, such a solution has not yet been successfully reduced to practice. On the one hand, the available frequency band is already utilized completely. The range from 0 to 1.3 MHz is taken up by the reduced-frequency, quadrature modulated chrominance subcarrier and the rest of the frequency band is occupied by the frequency spectrum of the modulated picture carrier. Recording of the audio carrier in the remaining narrow frequency gap between the modulated chrominance subcarrier and the frequency spectrum of the picture carrier is practically impossible because of the required steep filter band edges for the chrominance subcarrier and the picture carrier, due to the occurring phase and group delay errors.

On the other hand, if the audio signal is recorded on the oblique tracks, there results considerable interference during playback due to the switching between video heads, which does not interfere with picture playback because it takes place during the vertical blanking periods. During playback of the audio signal, however, this switching of heads at a frequency of 50 Hz becomes audible as an annoying noise component because the playback of the audio signal, which is modulated, for example, on a carrier, is temporarily interrupted due to the switching of heads. The resulting spike-type interference pulses at a fundamental frequency of 50 Hz with a large harmonics content produce a continuous, annoying noise during audio playback.

SUMMARY OF THE INVENTION

It is an object of the present invention to reduce the audio interference occurring as a result of the switching of heads during recording of the audio information of a television signal by frequency modulation of an audio carrier along the oblique tracks of the recording tape.

The above and other objects are achieved, according to the invention, in a system for playing back a television signal, composed of a picture carrier which is FM modulated with a video signal and an audio carrier which is FM modulated with an LF audio signal, recorded along oblique tracks on a magnetic tape, the system including two playback heads which alternately scan successive tracks, in that during playback an amplifier conducting the audio carrier generates output oscillations, and/or during recording the amplitude of the audio carrier is increased, each time scanning of the tape switches from one head to the other.

According to the present invention, the amplitude breaks of the audio carrier as a result of the switching between heads is eliminated in that the selective amplifier provided to amplify the audio carrier is intentionally excited into resonance during this period. Each amplitude break of the audio carrier is then definitely filled by a carrier signal whose frequency has a value which also occurs in the modulated audio carrier during normal operation.

The amount of circuitry required for this purpose is small because a selective amplifier is needed in any case to amplify the audio carrier and it is merely necessary that the keying pulse periodically increases the gain of this amplifier. Such an increase in gain can be effected, for example, by periodically reducing the feedback generally present in such an amplifier. As tests have shown, it is possible with the present invention to reduce the interference in the audio signal by 20 dB, i.e. to about 10%.

The curve shape of the keying pulse for increasing the gain is preferably selected to be continuous and without sudden changes in amplitude, e.g. to be triangular. Then the gain of the amplifier is increased continuously up to a maximum value approximately in the middle of the head switching period and then the gain is reduced again continuously down to normal amplifier operation. With this continuous change in gain, undesirable build-up and decay transients and interferences in the useful signal can be avoided. Possibly occurring increases in amplitude in the FM modulated audio carrier during the switching of heads as a result of the increased amplifier gain are compensated in the amplitude limited which is generally a part of an FM demodulator.

One embodiment of the invention will be described in greater detail with reference to the drawing figures.

BRIEF DESCRIPTION OF THE DRAWING

FIGS. 3a–e are signal waveform diagrams of the signals appearing at various points in the circuit of FIG. 2.

FIG. 4 is a circuit diagram for one embodiment of a selective amplifier of the circuit of FIG. 2.

FIGS. 6 and 7 are signal waveform diagrams of the signals appearing in the circuit of FIG. 5.

DESCRIPTION OF THE PREFERRED EMBODIMENTS

Figure 1:
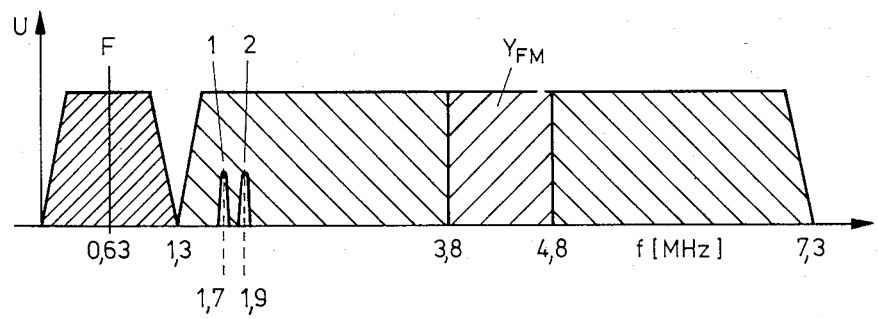
FIG. 1 shows a frequency spectrum of the individual signals recorded on a magnetic tape of a video recorder.

FIG. 1 shows a recorded television signal spectrum in which a chrominance subcarrier F at a center frequency of 0.63 MHz is recorded on the magnetic tape in the lower frequency band. This chrominance subcarrier has been obtained by frequency reduction from the quadrature modulated PAL chrominance subcarrier. The video signal Y is recorded by frequency modulation of a picture carrier at a center frequency of 4.3 MHz. Its statistical modulation characteristic extends between the frequencies of 3.8 and 4.8 MHz, with 3.8 MHz corresponding to the black value and 4.8 MHz corresponding to the white value of the video signal. Modulation then produces a frequency spectrum extending between 1.3 and 7.3 MHz.

Within this frequency spectrum, two audio carriers 1 and 2 which have each been frequency modulated with an LF audio signal are recorded at the respective frequencies of 1.7 and 1.9 MHz. The two LF audio signals may represent the channels of a stereo signal or audio signals in different languages.

The recording of the illustrated signal on the oblique tracks of a magnetic tape is made by means of two video heads, one picture field being recorded on each successive oblique track. Thus, during recording and during playback, the two video heads are each alternatingly effective for one field.

The resultant switching between heads produces interference in the played-back audio signal at a fundamental frequency of 50 Hz. This interference can also occur if the scanning periods of the two video heads overlap at the ends of the tracks and during these times the signal path receives signals from both video heads. Depending on the phase position of the two carriers picked up by the video heads, these carriers may be algebraically added, and thus the amplitude may be increased or they are in phase opposition so that the carriers may cancel one another out and thus there occurs an amplitude break in the signal.

Figure 2:
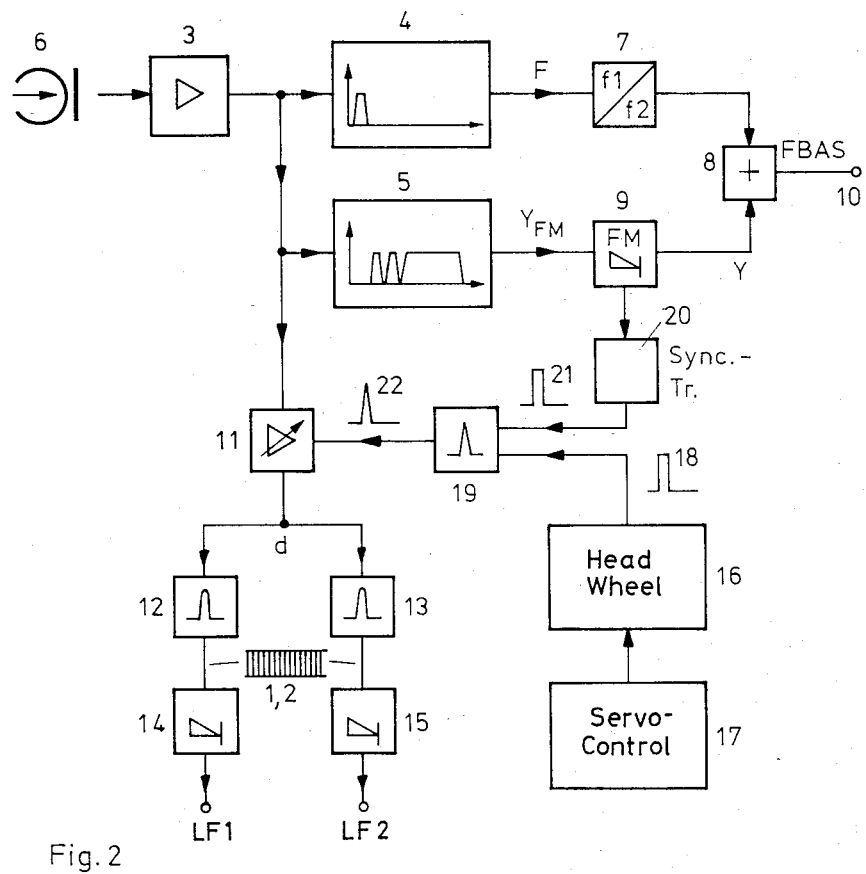
FIG. 2 is a block circuit diagram of one embodiment of a video recorder playback system according to the invention.

In the playback system of FIG. 2, the signal of FIG. 1 which has been recorded along successive oblique tracks that are scanned alternatingly by the two video heads is fed via an amplifier 3 to two frequency selective filters 4 and 5. The two video heads are here shown symbolically as a single video head 6.

In the filter 4, the modulated chrominance subcarrier F at the center frequency of 0.63 MHz is selectively filtered, and is then reconverted to the original PAL chrominance subcarrier frequency of 4.43 MHz in a frequency converter 7 and fed to one input of an adder stage 8. In filter 5, the modulated picture carrier which extends from 1.3 to 7.3 MHz is selectively filtered and fed to a demodulator 9. The resulting demodulated video signal Y is likewise fed to the adder stage 8 which then furnishes the FBAS signal at terminal 10. The filter 5 is composed of two notch filters which filter out narrow bands around the frequencies of 1.7 and 1.9 MHz, i.e. the frequencies of the two audio carriers. Thus there is no interference in the playback picture from the audio carriers 1, 2.

The signal from the output of the amplifier 3 also reaches a variable gain amplifier 11 and then two frequency selective filters 12 and 13 which are tuned to the frequencies of 1.7 and 1.9 MHz. The filters 12 and 13 filter the two modulated audio carriers 1, 2 and their sidebands and feed them to FM demodulators 14 and 15. The latter furnish the two low frequency audio signals LF1 and LF2 at their output terminals.

FIG. 2 also depicts the head wheel 16 whose rate of rotation is regulated in a known manner by a servo control 17 so that the video heads scan the magnetic tape precisely along the oblique tracks. A head wheel pulse 18 is generated by the permanent magnets and associated exciter coils of the head wheel 16 during each switching of heads, i.e. after each scanning of one oblique track or after each picture field, respectively. This pulse 18 is fed to a pulse former 19. Additionally, vertical pulses 21 are generated in a synchronous separating stage 20 from the video signal at the output of filter 5 and pulses 21 are likewise fed to the pulse shaper 19. The pulse shaper 19 generates a train of keying pulses whose repetition rate is determined essentially by the pulses 18 on the basis of the rotation of the head wheel 16 and whose correct phase position is determined by pulses 21 on the basis of the signal at the output of filter 5.

During scanning of a picture field, the amplifier 11 serves as a selective amplifier for the two modulated audio carriers 1 and 2. During the switching between heads, the gain of the amplifier 11 is increased by each keying pulse 22 in such a way that the amplifier is excited into oscillation at its resonant frequency, i.e. approximately at the frequency of the modulated audio carriers. This prevents breaks in the audio carriers fed to filters 12 and 13.

FIG. 3a shows the individual carrier signal groups 23 for the modulated audio carriers of successive picture fields, which each have a duration of 20 ms, appearing in the output signal from amplifier 3. The switching of heads produces amplitude breaks 24 in the audio carrier groups between successive fields, i.e. every 20 ms. These amplitude breaks would, in prior art circuits, produce spike-shaped interference pulses at the output of the demodulators 14 and 15, as shown in FIG. 3b. These interference pulses become audible during audio playback as crackling noises at a fundamental frequency of 50 Hz.

FIG. 3c shows the keying pulses 22 with which the gain of the amplifier 11 is increased during the amplitude breaks 24 until the amplifier is excited into resonance. The triangular shape of the keying pulses produces a continuous change in gain so as to avoid interference which would result from too rapid a change in gain. Due to the fact that the amplifier 11 acts as an oscillator during the switching of heads, and thus also furnishes an output signal during this period, a continuous carrier appears at the output of the amplifier 11, as shown in FIG. 3d, which no longer exhibits the amplitude breaks 24 shown in FIG. 3a.

After demodulation of the thus processed audio carriers, the interference signals appearing at the outputs of the demodulators 14 and 15, as shown in FIG. 3e, have amplitudes which are reduced to about 10% of the amplitude of the interference signal of FIG. 3b, which corresponds to an improvement in the signal to noise ratio of 20 dB. The interference based on the signal of FIG. 3d is practically undiscernible.

FIG. 4 shows one circuit embodiment for the selective amplifier 11. The frequency modulated audio carrier $F_{LF}$ from amplifier 3 is fed via a decoupling capacitor to the base of a transistor 25 which is provided with a parallel resonant circuit 26 tuned to a frequency possibly midway between the two audio carrier frequencies, i.e. of 1.8 MHz, and serving as operating resistor and with the feedback resistor 27. The amplified, frequency modulated audio carrier $F_{LF}$ is obtained at terminal 28. The collector-emitter path of a further transistor 29 is connected in parallel with resistor 27.

During normal amplifier operation, while scanning an oblique track, transistor 29, which is connected in parallel with the resistor 27, is blocked. The resistor 27 then acts in a known manner as a feedback resistance to linearize, and reduce the gain of the amplifier. Transistor 25 then operates as a linear amplifier for the modulated audio carrier.

During switching of heads, the transistor 29 is controlled into conductance by the keying pulses 22 and thus presents a low resistance in parallel with resistor 27. This reduces the feedback of the amplifier and increases its effective gain in such a way that, as a result of the positive feedback paths which are always present in practice, the amplifier begins to produce oscillations and during this time furnishes at terminal 28 an unmodulated carrier of constant amplitude and at approximately the frequency of the modulated audio carrier.

According to a further feature of the invention, a further improvement can be realized by increasing the amplitude of the recorded audio carrier by the keying pulse during each switching of heads.

This solution is based on the realization that an increase in the amplitude of the recorded audio carrier during the switching of heads can considerably reduce the interference in the audio signal caused by the switching of heads. This increase in amplitude is possible because, during this time, no picture playback occurs and thus no interference can occur in the played-back picture. The increase in amplitude may extend over several picture lines, e.g. 6 to 10 lines, before the vertical sync pulse because in commercially available black and white and color television receivers the picture overlap required for reasons of tolerance keeps these lines from being visible on the screen.

The interference occurring in the sound itself by the switching of heads can be reduced by about 20 to 30 dB by the measure according to the invention. Additional circuit measures during playback are then not necessary since the improvement results automatically due to the increase in the amplitude of the audio carrier performed during recording.

One embodiment for this solution will be described with the aid of FIGS. 5-7. The lower case letters a, b and c in FIG. 5 indicate the circuit locations of the signals in the corresponding ones of FIG. 6.

Figure 5:
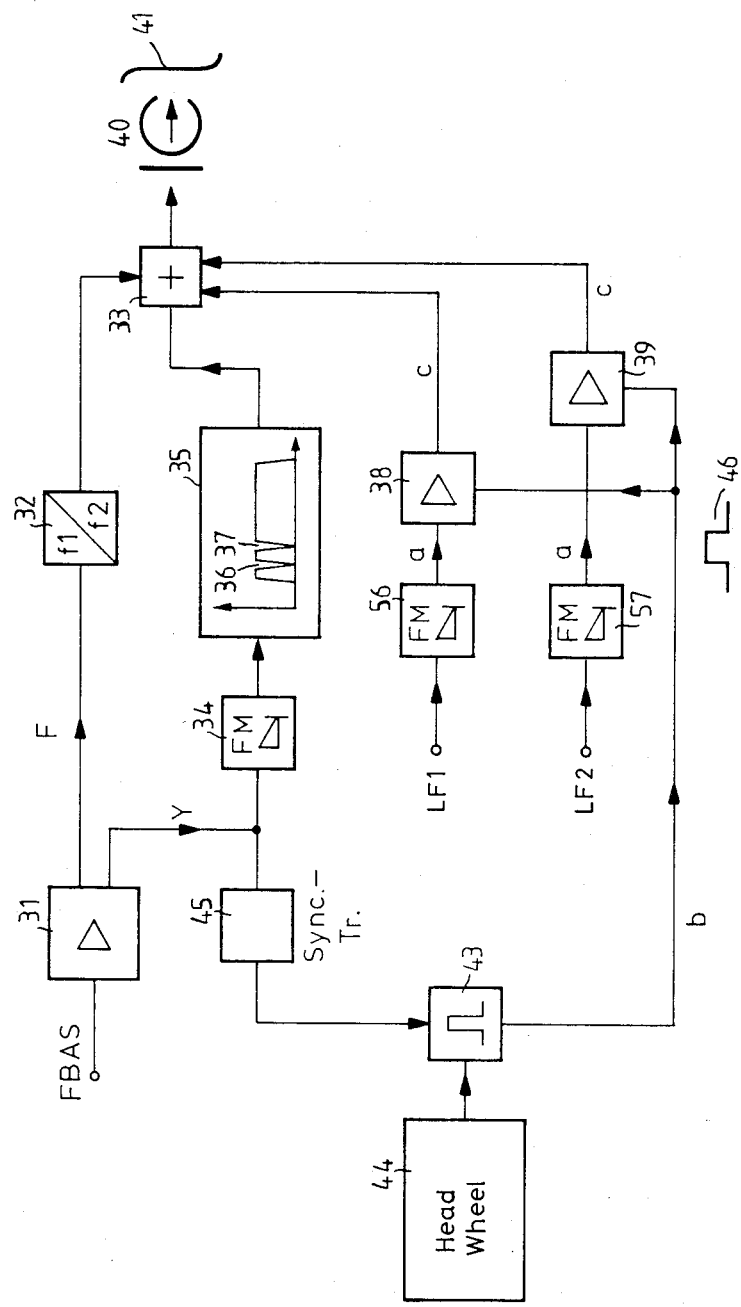
FIG. 5 is a block circuit of one embodiment of a recording system according to the present invention.

In FIG. 5, the FBAS signal is selectively divided into the modulated PAL chrominance subcarrier F at a frequency of 4.43 MHz and the luminance signal Y. In the frequency converter 32, the chrominance subcarrier is reduced in frequency to a center frequency of 0.63 MHz and is then fed to the adder stage 33. In the FM modulator 34, the luminance signal Y modulates the picture carrier which is likewise fed to the adder stage 33 via the filter 35. The transmission curve of filter 35 lies above the frequency band of the reduced-frequency chrominance subcarrier and has two blocking points 36 and 37, at 1.7 MHz and 1.9 MHz, respectively.

Two audio signls LF 1 and LF 2, which represent a stereo signal or an audio signal in two different languages, are fed to two respective FM modulators 56 and 57 which each generate a frequency modulated audio carrier. These audio carriers, at respective center frequencies of 1.7 and 1.9 MHz, are likewise fed to the adder stage 33 via respective controllable amplifiers 38 and 39. The adder stage 33 thus furnishes the reduced-frequency chrominance subcarrier F, the picture carrier, frequency modulated with the signal Y, a first audio carrier at the frequency of 1.7 MHz modulated with audio signal LF 1 and a second audio carrier at the frequency of 1.9 MHz modulated with LF 2. This signal mixture at the output of the adder stage 33 is recorded by the video head 40 on oblique tracks of the magnetic tape 41. In practice, the video head 40 is formed by two video heads which rotate by means of a head drum and which alternatingly record the signals associated with successive picture fields on oblique tracks on the magnetic tape 41.

FIG. 6 serve to illustrate the control of the amplitude of the audio carriers supplied by modulators 56 and 57. FIG. 6a shows, for successive picture fields occurring every 20 ms, the carrier groups for the frequency modulated signal scanned during playback from tape 41. It can be seen that breaks 42 occur in the signal between two picture fields at a repetition frequency of 50 Hz. After demodulation, these breaks lead to spike-shaped interferences at 50 Hz in the audio channel, audible as a crackling noise in the sound.

The circuit shown in FIG. 5 additionally includes a pulse generator 43 which is controlled, on the one hand, by a pulse derived from head wheel 44 and, on the other hand, by a pulse at the vertical sync frequency extracted by means of a separator stage 45 from the Y signal.

During switching of heads, and thus during the breaks 42, the generator 43 generates, at its output, pulses 46 each of a duration of 640 $\mu$s as shown in FIG. 6b. These pulses reach the control inputs of the amplifiers 38 and 39 and increase their gain to twice the normal value. This produces, from the two modulated audio carriers of constant amplitude, the audio carriers shown in FIG. 6c which appear at the outputs of the amplifiers 38 and 39 and whose amplitude has been raised to twice its normal value for the duration of pulses 46. The audio carriers shown in FIG. 6c are then used for the recording. The increased amplitude of the signal of FIG. 6c during the breaks 42 has the results that the audible interference usually occurring during audio playback is reduced considerably.

FIG. 7 shows the time position of the pulses 46 relative to the sync pulse mixture of the video signal. The two top lines of FIG. 7 depict the signals associated with two successive picture fields. Shown are the horizontal sync pulses Z, the front equalizing pulses $A_v$, the vertical sync pulses V and the rear equalizing pulses $A_H$. The keying pulse 46 begins approximately 11.5 lines scanning periods before the start t2 of the vertical sync pulses V, as indicated by the vertical dashed line. The middle of the keying pulse lies at time t1, i.e. approximately 6.5 lines before the time t2 which is the beginning of the first vertical sync pulse V. Time t1 is the moment of head switching, at which, for example, the scanning of signals is switched from one video head to the other video head so as to cause the above-described interference in the sound. The beginning and end of the keying pulse 46 are symmetrically spaced with respect to time t1. The total duration of the keying pulse 46 is 10 lines, i.e. five lines (320 $\mu$s) before t1 and five lines after t1. The duration of the keying pulse 46 may also have other values, e.g. in the order of magnitude of 300–500 μs.

The keying pulse 46 which begins before the start of the vertical sync pulse can be generated as follows. At the start of a picture field numbered n, as shown in FIGS. 5 and 6 there is generated a pulse which is derived from a pulse produced by the head wheel and from the vertical sync pulse. This pulse initially does not have the desired time position shown in FIG. 7 but begins a little later than that position. This pulse is delayed by a pulse former stage or a delay member by a little less than the duration of one picture field, e.g. by about 300 lines, and is used just before the beginning of the picture field number n+1 as the keying pulse 46 of FIG. 7. The time position of pulse 46 is selected so that this pulse covers the time period around t1 even with tolerances, i.e. the time in which the above-mentioned spike-shaped pulse would appear which could produce the interference in the sound in the demodulated audio signal during playback.

It will be appreciated that the various signal parameters mentioned herein, such as the number of lines/frame and the duration of a line scanning period, can be varied depending on the broadcast system in use.

The pulse shaper 19 for generating pulse 22 as well as pulse generator 43 for generating pulse 46 may be realized by integrated circuits. One integrated circuit suitable for generating such pulses is the IC "precision function generator/voltage controlled oscillator" No. 8038 manufactured by Intersil.

It will be understood that the above description of the present invention is susceptible to various modifications, changes and adaptations, and the same are intended to be comprehended within the meaning and range of equivalents of the appended claims.

What is claimed is:

1. In a system for playing back a television signal, composed of a picture carrier which is FM modulated with a video signal and an audio carrier which is FM modulated with an LF audio signal, recorded along oblique tracks on a magnetic tape, the system including two playback heads which alternately scan successive tracks, the improvement comprising: a controllable amplifier connected to conduct the modulated audio carrier signal provided by said heads; and means connected for applying a keying pulse to said amplifier at the time that scanning switches from one head to the other, for increasing the gain of said amplifier, as a function of said keying pulse, to an extent to cause said amplifier to generate output oscillations at a selected frequency at least approximately equal to the audio carrier frequency for reducing audio interference occurring as a result of amplitude breaks in the recorded audio carrier.

2. System as defined in claim 1 wherein said keying pulse has a form which is continuous without abrupt changes in amplitude.

3. System as defined in claim 2 wherein the curve shape of said keying pulse is triangular.

4. System as defined in claim 1 wherein the duration of said keying pulse is about 100 μs.

5. System as defined in claim 1 wherein said keying pulse begins before the switching of heads and ends after the switching of heads.

6. System as defined in claim 1 further comprising a head wheel carrying said heads and wherein said keying pulse is obtained from a pulse derived from said head wheel.

7. System as defined in claim 1 wherein the television signal includes vertical sync pulses and the generation of each keying pulse is controlled by a respective vertical sync pulse derived from the television signal.

8. In a system for recording a television signal, composed of a picture carrier which is FM modulated with a video signal and an audio carrier which is FM modulated with an LF audio signal, along oblique tracks on a magnetic tape, the system including two recording heads which alternately record successive tracks, the improvement comprising: a controllable amplifier connected for conducting the audio carrier signal; and means connected to said amplifier for providing a keying pulse at the time that recording switches from one head to the other, for increasing the amplitude of the modulated audio carrier signal provided by said amplifier during switching between heads in order to reduce interference in the audio signal during switching from one head to the other.

9. System as defined in claim 8 wherein said keying pulse increases the amplitude of the audio carrier signal approximately by a factor of 2.

10. System as defined in claim 8 further comprising a head wheel carrying said heads and means associated with said head wheel for deriving a switching pulse each time recording switches from one head to the other, and wherein the television signal includes vertical sync pulses associated with the recording along each track, and said means for providing a keying pulse are connected for providing a respective keying pulse in response to each switching pulse and an associated vertical sync pulse.

11. System as defined in claim 8 wherein said means generate a control pulse each time that recording switches from one head to the other and produces a keying pulse at a fixed time after each control pulse.

12. System as defined in claim 8 wherein each keying pulse has a duration of about 400–600 μs.

13. System as defined in claim 8 wherein the television signal includes at least one vertical sync pulse associated with the signal portion recorded on each oblique track, and each keying pulse precedes in time the vertical sync pulse associated with the track on which recording occurs subsequent to the switching which precedes recording on that track.

14. System as defined in claim 8 wherein the beginning and end of each keying pulse are symmetrical in time with the associated instant of switching between heads.

15. System as defined in claim 14 wherein the television signal includes a train of vertical sync pulses associated with the signal portion recorded on each oblique track and recorded near the beginning of its associated track, and each keying pulse is produced at a time such that the midpoint thereof occurs at a time equal to approximately the duration of 6.5 picture scanning lines before the first one of a respective train of vertical sync pulses.

* * * * *